(12) United States Patent
Axnix et al.

(10) Patent No.: US 10,423,330 B2
(45) Date of Patent: Sep. 24, 2019

(54) DATA COLLECTION IN A MULTI-THREADED PROCESSOR

(71) Applicant: INTERNATIONAL BUSINESS MACHINES CORPORATION, Armonk, NY (US)

(72) Inventors: Christine Axnix, Dettenhausen (DE); Ute Gaertner, Schoenaich (DE); Jakob C. Lang, Altdorf (DE); Angel Nunez Mencias, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/811,911

(22) Filed: Jul. 29, 2015

(65) Prior Publication Data

US 2017/0031820 A1 Feb. 2, 2017

(51) Int. Cl.
*G06F 3/06* (2006.01)
*G06F 9/50* (2006.01)
*G06Q 10/06* (2012.01)
*G06Q 30/04* (2012.01)

(52) U.S. Cl.
CPC .......... *G06F 3/0604* (2013.01); *G06F 3/0647* (2013.01); *G06F 3/0673* (2013.01); *G06F 9/5072* (2013.01); *G06Q 10/06* (2013.01); *G06Q 30/04* (2013.01)

(58) Field of Classification Search
CPC ................ G06F 12/0802; G06F 2212/60
See application file for complete search history.

(56) References Cited

U.S. PATENT DOCUMENTS

| 6,807,623 | B2 * | 10/2004 | Migita | G06F 3/0613 712/214 |
| 7,089,391 | B2 * | 8/2006 | Geiger | G06F 12/08 709/247 |
| 7,610,541 | B2 * | 10/2009 | Tremaine | G06F 12/0802 714/763 |
| 7,657,880 | B2 * | 2/2010 | Wang | G06F 9/3842 711/213 |
| 7,779,233 | B2 * | 8/2010 | Le | G06F 9/3009 712/207 |

(Continued)

OTHER PUBLICATIONS

Dean M. Tullsen et al., "Simultaneous Multithreading: Maximizing On-Chip Parallelism", Jun. 1995, Proceedings of the 22nd Annual International Symposium On Computer Architecture, pp. 1-12, http://lazowska.cs.washington.edu/SMT.pdf.*

(Continued)

*Primary Examiner* — Christopher D Birkhimer
(74) *Attorney, Agent, or Firm* — Margaret McNamara; Matthew M. Hulihan; Heslin Rothenberg Farley & Mesiti PC

(57) ABSTRACT

Data collection is facilitated by a multi-threaded processor. One thread of the processor obtains data placed in a buffer by another thread of the processor. The thread placing the data in the buffer is an execution thread executing a customer application and the one thread obtaining the data from the buffer is an assist thread. The assist thread stores the data obtained from the buffer in a selected location, such as a cache, main memory, a measurement control block, a persistent storage device or a network.

19 Claims, 11 Drawing Sheets

(56) References Cited

U.S. PATENT DOCUMENTS

| | | | |
|---|---|---|---|
| 7,827,321 B2* | 11/2010 | Bartik | G06F 13/24 710/20 |
| 7,870,438 B2 | 1/2011 | Bartik et al. | |
| 7,881,906 B2 | 2/2011 | Bartik et al. | |
| 7,975,109 B2* | 7/2011 | McWilliams | G06F 12/0284 711/147 |
| 8,095,750 B2* | 1/2012 | Heller, Jr. | G06F 9/3004 707/703 |
| 8,117,403 B2* | 2/2012 | Heller, Jr. | G06F 12/0817 711/100 |
| 8,209,668 B2 | 6/2012 | Bartik et al. | |
| 8,230,422 B2* | 7/2012 | Bohrer | G06F 9/383 711/117 |
| 8,244,969 B2* | 8/2012 | McWilliams | G06F 12/0284 711/103 |
| 8,417,837 B2* | 4/2013 | Bartik | G06F 13/24 710/5 |
| 8,453,124 B2 | 5/2013 | Alexander et al. | |
| 8,453,161 B2* | 5/2013 | Gschwind | G06F 9/544 711/147 |
| 8,478,966 B2* | 7/2013 | Bartik | G06F 13/24 710/5 |
| 8,516,227 B2* | 8/2013 | Bartik | G06F 13/24 710/5 |
| 8,527,693 B2* | 9/2013 | Flynn | G06F 11/1008 711/103 |
| 8,595,744 B2* | 11/2013 | Tirumalai | G06F 9/4843 718/107 |
| 8,612,949 B2* | 12/2013 | Liao | G06F 8/4442 717/150 |
| 8,667,212 B2* | 3/2014 | McWilliams | G06F 12/0284 711/103 |
| 8,667,253 B2* | 3/2014 | Frazier | G06F 9/30101 712/28 |
| 8,806,178 B2 | 8/2014 | Bartik et al. | |
| 8,832,464 B2* | 9/2014 | Olson | G06F 9/30018 380/262 |
| 8,862,861 B2* | 10/2014 | Olson | G06F 9/3806 712/233 |
| 8,886,920 B2* | 11/2014 | Olson | G06F 9/3806 712/237 |
| 8,898,441 B2* | 11/2014 | Frazier | G06F 9/30123 712/233 |
| 8,904,156 B2* | 12/2014 | Shah | G06F 9/383 712/239 |
| 8,914,570 B2* | 12/2014 | Balakrishnan | G06F 12/0866 711/103 |
| 8,949,837 B2* | 2/2015 | Bohrer | G06F 9/383 711/122 |
| 9,026,705 B2* | 5/2015 | Feehrer | G06F 13/24 710/266 |
| 9,037,837 B2* | 5/2015 | Hall | G06F 9/3009 712/220 |
| 9,043,559 B2* | 5/2015 | Radovic | G06F 12/16 711/141 |
| 9,047,197 B2* | 6/2015 | Chou | G06F 9/3004 |
| 9,086,889 B2* | 7/2015 | Karlsson | G06F 9/3802 |
| 9,086,890 B2* | 7/2015 | Olson | G06F 9/3885 |
| 2002/0013915 A1* | 1/2002 | Migita | G06F 3/0613 714/6.13 |
| 2003/0061457 A1* | 3/2003 | Geiger | G06F 12/08 711/165 |
| 2004/0049655 A1* | 3/2004 | Allison | G06F 9/544 712/200 |
| 2005/0055541 A1* | 3/2005 | Aamodt | G06F 9/30101 712/217 |
| 2006/0155963 A1* | 7/2006 | Bohrer | G06F 9/383 712/214 |
| 2007/0226428 A1* | 9/2007 | Tremaine | G06F 12/0802 711/154 |
| 2007/0271565 A1* | 11/2007 | Tirumalai | G06F 9/4843 718/100 |
| 2008/0288726 A1* | 11/2008 | Heller, Jr. | G06F 9/3004 711/147 |
| 2008/0288730 A1* | 11/2008 | Heller, Jr. | G06F 12/0817 711/159 |
| 2008/0301256 A1* | 12/2008 | McWilliams | G06F 12/0284 709/214 |
| 2009/0106534 A1* | 4/2009 | Le | G06F 9/3851 712/215 |
| 2010/0088444 A1* | 4/2010 | Bartik | G06F 13/24 710/260 |
| 2010/0162247 A1* | 6/2010 | Welc | G06F 9/466 718/101 |
| 2010/0251160 A1 | 9/2010 | Shafi et al. | |
| 2011/0029758 A1* | 2/2011 | Bartik | G06F 13/24 712/205 |
| 2011/0055838 A1 | 3/2011 | Moyes | |
| 2011/0078419 A1* | 3/2011 | Bartik | G06F 13/24 712/220 |
| 2011/0289263 A1* | 11/2011 | McWilliams | G06F 12/0284 711/103 |
| 2011/0296431 A1* | 12/2011 | Gschwind | G06F 9/544 719/310 |
| 2012/0089816 A1* | 4/2012 | Bartik | G06F 13/24 712/205 |
| 2012/0151118 A1* | 6/2012 | Flynn | G06F 11/1008 711/6 |
| 2012/0198459 A1* | 8/2012 | Bohrer | G06F 9/383 718/102 |
| 2012/0254594 A1* | 10/2012 | Hall | G06F 9/3009 712/205 |
| 2012/0311246 A1* | 12/2012 | McWilliams | G06F 12/0284 711/103 |
| 2013/0283101 A1* | 10/2013 | Yang | G06F 11/3612 714/37 |
| 2013/0332709 A1* | 12/2013 | Bartik | G06F 13/24 712/225 |
| 2013/0346793 A1* | 12/2013 | Flynn | G06F 11/1008 714/6.3 |
| 2014/0208083 A1* | 7/2014 | Burnett | G06F 9/38 712/228 |
| 2014/0215478 A1* | 7/2014 | Goyal | G06N 5/02 718/102 |
| 2014/0218773 A1* | 8/2014 | Hara | G06K 15/1851 358/474 |
| 2014/0218774 A1* | 8/2014 | Hara | G06K 15/1851 358/474 |
| 2014/0297919 A1* | 10/2014 | Nachimuthu | G11C 14/009 711/102 |
| 2014/0297961 A1* | 10/2014 | Thottethodi | G06F 12/0875 711/132 |
| 2014/0304475 A1* | 10/2014 | Ramanujan | G06F 12/0895 711/128 |
| 2014/0325189 A1* | 10/2014 | Bartik | G06F 13/24 712/220 |
| 2014/0331211 A1* | 11/2014 | Ma | G06F 11/3688 717/131 |
| 2014/0359219 A1* | 12/2014 | Evans | G06F 12/0802 711/118 |
| 2015/0074668 A1 | 3/2015 | Burka et al. | |
| 2015/0106566 A1* | 4/2015 | Godard | G06F 12/0893 711/118 |
| 2015/0193353 A1* | 7/2015 | Habermann | G06F 12/0897 711/122 |

OTHER PUBLICATIONS

Free Software Foundation, "Data Prefetch Support", Dec. 24, 2001, pp. 1-10, https://web.archive.org/web/20011224123042/https://gcc.gnu.org/projects/prefetch.html.*

Anonymous, "Load And Store", Oct. 10, 2002, pp. 1, https://web.archive.org/web/20021010133132/https://chortle.ccsu.edu/AssemblyTutorial/Chapter-15/ass15_2.html.*

Hakim Weatherspoon, "Caches (Writing)", 2013, pp. 1-43, http://www.cs.cornell.edu/courses/cs3410/2013sp/lecture/18-caches3-w.pdf.*

(56) References Cited

OTHER PUBLICATIONS

Anonymous, "Interaction Policies with Main Memory", Jul. 7, 2015, pp. 1-3, https://web.archive.org/web/20150707202154/http://web.cs.iastate.edu/~prabhu/Tutorial/CACHE/interac.html.*

Anonymous, "Introduction to Caches", Nov. 26, 2010, pp. 1-11, https://web.archive.org/web/20101126091733/https://www.cs.umd.edu/class/sum2003/cmsc311/Notes/Memory/introCache.html.*

Webopedia, "Data Compression", Apr. 20, 2011, pp. 1-3, https://web.archive.org/web/20010410062808/https://www.webopedia.com/TERM/D/data_compression.html (Year: 2011).*

Webopedia, "Encryption", Apr. 5, 2001, pp. 1-4, https://web.archive.org/web/20010405231458/https://www.webopedia.com/TERM/E/encryption.html (Year: 2001).*

Mell, Peter and Tim Grance, "The NIST Definition of Cloud Computing," National Institute of Standards and Technology, Information Technology Laboratory, Special Publication 800-145, Sep. 2011, pp. 1-7.

IBM, "z/Architecture—Principles of Operation," IBM Publication No. SA22-7832-10, 11$^{th}$ Edition, Mar. 2015, pp. 1-1732.

Axnix, Christine, "Data Collection in a Multi-Threaded Processor," U.S. Appl. No. 14/941,578, filed Nov. 14, 2015, pp. 1-40.

List of IBM Patents or Patent Applications Treated as Related dated Apr. 11, 2016, pp. 1-2.

Office Action in U.S. Appl. No. 14/941,578 dated Sep. 19, 2016, pp. 1-22.

Final Office Action in U.S. Appl. No. 14/941,578 dated Jan. 25, 2017, pp. 1-22.

Office Action in U.S. Appl. No. 14/941,578 dated Jun. 20, 2017, pp. 1-36.

Final Office Action in U.S. Appl. No. 14/941,578 dated Sep. 28, 2017, pp. 1-81.

Studer, Ahren, "A Survey on Helper Threads and Their Implements," (http://citeseerx.ist.psu.edu/viewdoc/download?doi=10.1.1.91.6382&rep—repl&type=pdf), downloaded from Internet Jul. 16, 2015 (no further date information available), pp. 1-12.

* cited by examiner

DATA COLLECTION IN A MULTI-THREADED PROCESSOR

BACKGROUND

One or more aspects relate, in general, to facilitating processing in multi-threaded processors, and in particular, to facilitating collection of data in such processors.

A processor may include multiple threads, such as multiple hardware threads, that have instructions executing simultaneously. This is referred to as simultaneous multithreading (SMT).

Typically, a thread executes customer applications and may also perform data collection for hardware measurements/samples of the processor on which the thread is executing. The data collected is placed in a buffer on the processor. Today, this buffer is not read from or written to at the same time from different threads; it is only accessed by one thread at a time. In regular intervals, the thread pauses execution of the customer application it is executing to invoke a task to read out and store away the hardware samples into memory. This takes away execution cycles from the thread and impacts performance.

SUMMARY

Shortcomings of the prior art are overcome and additional advantages are provided through the provision of a computer system for facilitating data collection. The computer system comprises a memory; and a processor in communication with the memory, wherein the computer system is configured to perform a method. The method includes, for instance, obtaining, by one thread of a processor, data placed in a buffer by another thread of the processor, the other thread being an execution thread executing a customer application and the one thread being an assist thread configured to execute in at least an assist mode; and storing, by the one thread, the data obtained from the buffer in a selected location, wherein based on the thread being in the assist mode, the obtaining and the storing are performed in lieu of executing customer applications by the one thread.

Methods and computer program products relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In accordance with one or more aspects, a capability is provided for facilitating collection of data, such as measurement or sampling data, in a multi-threaded processor operating within a computing environment. The processor supports, for instance, multi-threading, such as simultaneous multi-threading (SMT), which means there can be effectively multiple logical central processing units (CPUs) operating simultaneously on the same physical processor hardware. Each of these logical CPUs is considered a thread.

Figure 1:
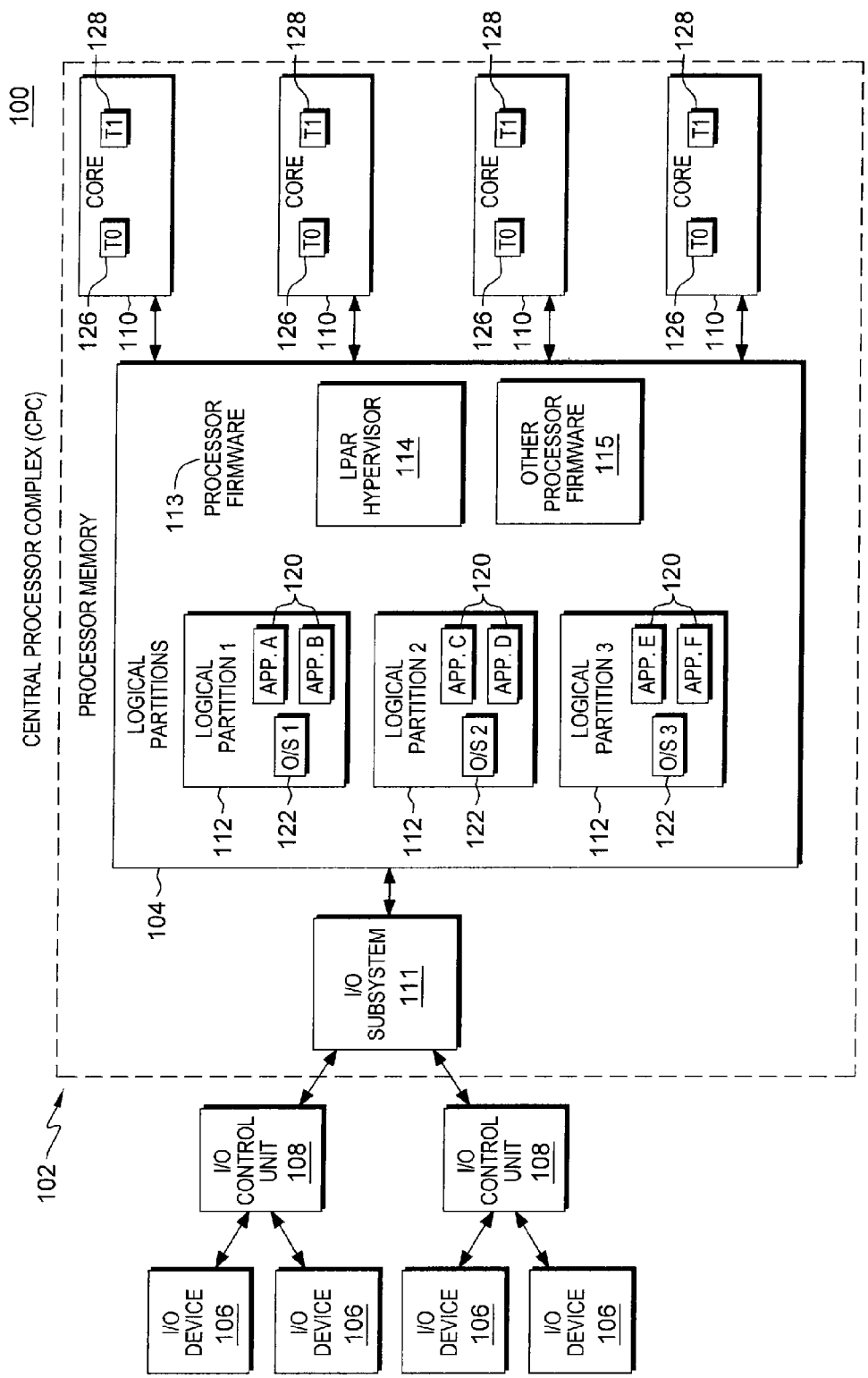
FIG. 1 depicts one example of a computing environment to incorporate and use one or more aspects of facilitating collection of data in a multi-threaded processor.

One example of a computing environment to incorporate and use one or more aspects of facilitating collection of data is described with reference to FIG. 1. Referring to FIG. 1, in one example, a computing environment 100 is based on the z/Architecture, offered by International Business Machines (IBM®) Corporation, Armonk, N.Y. The z/Architecture is described in an IBM Publication entitled "z/Architecture—Principles of Operation," Publication No. SA22-7832-10, 11$^{th}$ Edition, March 2015, which is hereby incorporated by reference herein in its entirety.

Z/ARCHITECTURE, IBM, ZNM, Z/OS, POWER, and POWERPC (referenced herein) are registered trademarks of International Business Machines Corporation, Armonk, N.Y. Other names used herein may be registered trademarks, trademarks or product names of International Business Machines Corporation or other companies.

As one example, computing environment 100 includes a central processor complex (CPC) 102 coupled to one or more input/output (I/O) devices 106 via one or more control units 108. Central processor complex 102 includes, for instance, a processor memory 104 (a.k.a., main memory, main storage, central storage) coupled to one or more processor cores 110 (also referred to herein as processors or cores), and an input/output subsystem 111, each of which is described below.

Processor memory 104 includes, for example, one or more partitions 112 (e.g., logical partitions), and processor firmware 113, which includes, e.g., a logical partition hypervisor 114 and other processor firmware 115. One example of logical partition hypervisor 114 is the Processor Resource/

System Manager (PR/SM), offered by International Business Machines Corporation, Armonk, N.Y.

A logical partition functions as a separate system and has one or more applications 120, and optionally, a resident operating system 122 therein, which may differ for each logical partition. In one embodiment, the operating system is the z/OS operating system, the z/VM operating system, the z/Linux operating system, or the TPF operating system, offered by International Business Machines Corporation, Armonk, N.Y.

Logical partitions 112 are managed by logical partition hypervisor 114, which is implemented by firmware running on cores 110. As used herein, firmware includes, e.g., the microcode and/or millicode of the processor core. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Processor cores 110 are physical processor resources allocated to the logical partitions. In particular, each logical partition 112 has one or more logical processors, each of which represents all or a share of a core 110 allocated to the partition. The logical processors of a particular partition 112 may be either dedicated to the partition, so that the underlying core resource 110 is reserved for that partition; or shared with another partition, so that the underlying core resource is potentially available to another partition.

In one example, at least one of the cores is a multi-threaded processor, such as a simultaneous multi-threading processor, that includes multiple threads (i.e., multiple logical CPUs operating simultaneously). In one example, the core includes two threads, but in other embodiments, there may be more than two threads. Two threads, referred to herein as T0 (126) and T1 (128), are only one example. In support of simultaneous multi-threading, the processor core hardware contains the full architected state (e.g., z/Architecture and micro-architected state) for each thread.

Input/output subsystem 111 directs the flow of information between input/output devices 106 and main storage 104. It is coupled to the central processing complex, in that it can be a part of the central processing complex or separate therefrom. The I/O subsystem relieves the processor cores of the task of communicating directly with the input/output devices and permits data processing to proceed concurrently with input/output processing. To provide communications, the I/O subsystem employs I/O communications adapters. There are various types of communications adapters including, for instance, channels, I/O adapters, PCI cards, Ethernet cards, Small Computer Storage Interface (SCSI) cards, etc. In the particular example described herein, the I/O communications adapters are channels, and therefore, the I/O subsystem is referred to herein as a channel subsystem. However, this is only one example. Other types of I/O subsystems can be used.

The I/O subsystem uses one or more input/output paths as communication links in managing the flow of information to or from input/output devices 106. In this particular example, these paths are called channel paths, since the communication adapters are channels.

Figure 2:
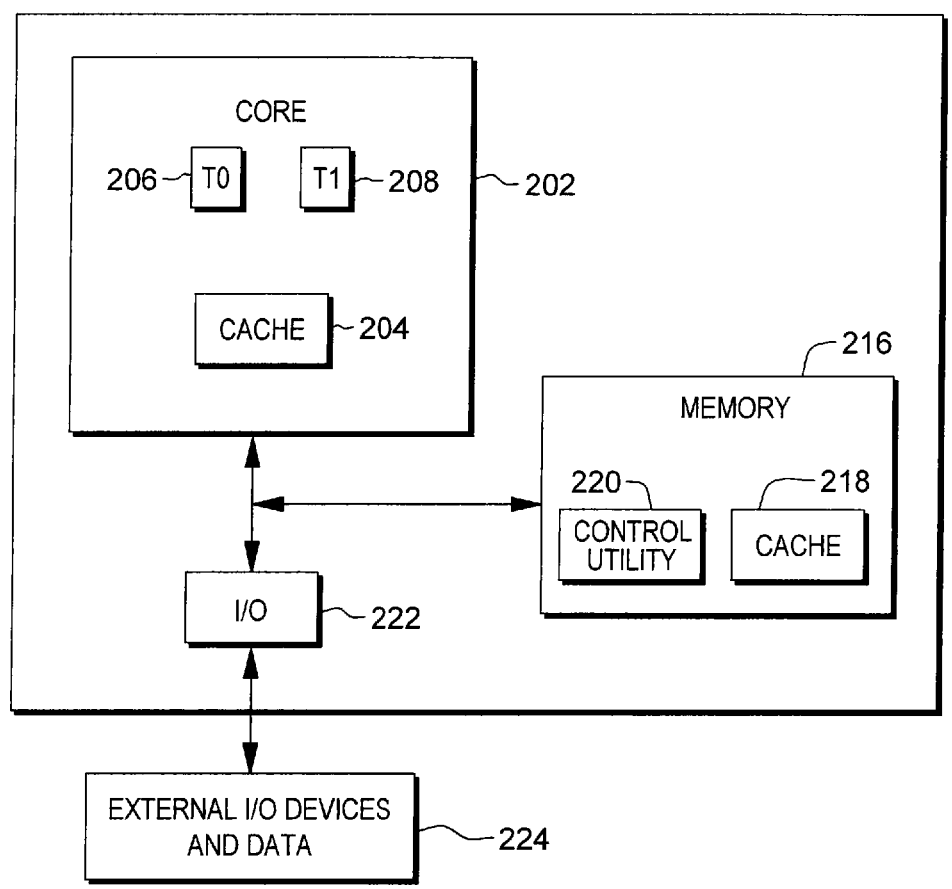
FIG. 2 depicts another example of a computing environment to incorporate and use one or more aspects of facilitating collection of data in a multi-threaded processor.

Another example of a computing environment to incorporate and use one or more aspects of facilitating collection of data is described with reference to FIG. 2. In this example, a computing environment 200 includes a non-partitioned environment implemented based on the z/Architecture (or another architecture in another embodiment). It includes a core 202 that includes, for instance, one or more caches 204, and at least two threads, T0 (206), T1 (208).

Core 202 is communicatively coupled to a memory 216 having one or more caches 218 and at least one control utility 220, such as an operating system; and to an input/output (I/O) subsystem 222. I/O subsystem 222 is communicatively coupled to external I/O devices 224 that may include, for example, data input devices, sensors and/or output devices, such as displays.

Figure 3A:
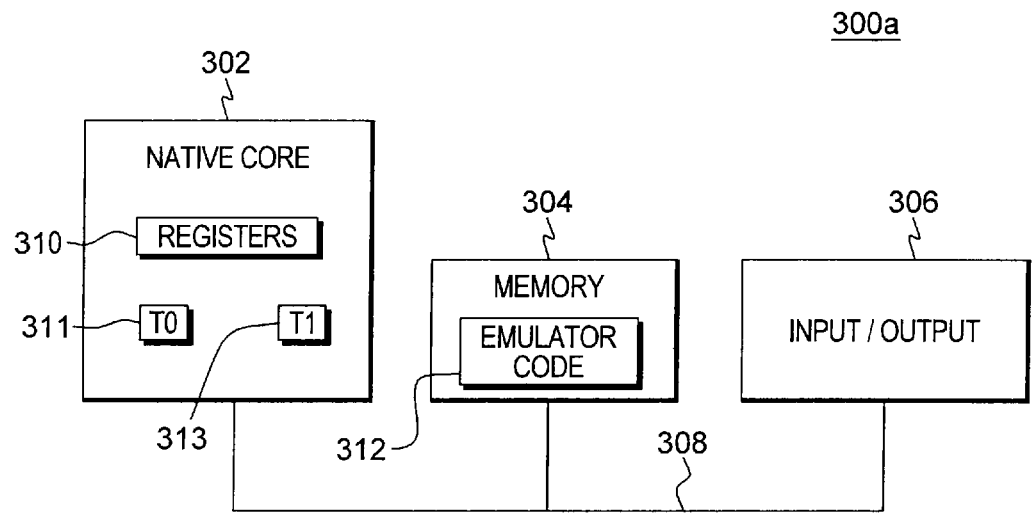
FIG. 3A depicts yet another example of a computing environment to incorporate and use one or more aspects of facilitating collection of data in a multi-threaded processor.

Another embodiment of a computing environment to incorporate and use one or more aspects of facilitating collection of data is described with reference to FIG. 3A. In this example, a computing environment 300a includes, for instance, a native core 302, a memory 304, and one or more input/output devices and/or interfaces 306 coupled to one another via, for example, one or more buses 308 and/or other connections. As examples, computing environment 300a may include a PowerPC processor or a Power Systems server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native core 302 includes one or more native registers 310, such as one or more general purpose registers and/or one or more special purpose registers, used during processing within the environment that include information that represents the state of the environment at any particular point in time. Further, native core 302 may include, for instance, at least two threads, T0 (311), T1 (313).

Moreover, native core 302 executes instructions and code that are stored in memory 304. In one particular example, the processor core executes emulator code 312 stored in memory 304. This code enables the computing environment configured in one architecture to emulate one or more other architectures. For instance, emulator code 312 allows machines based on architectures other than the z/Architecture, such as PowerPC processors, Power Systems servers, HP Superdome servers or others, to emulate the z/Architecture and to execute software and instructions developed based on the z/Architecture.

Figure 3B:
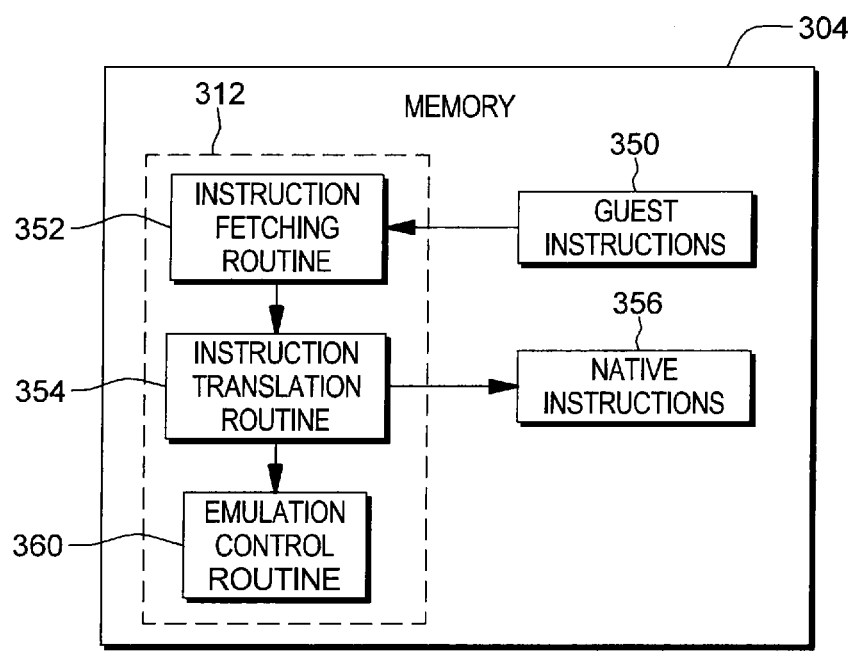
FIG. 3B depicts further details of a memory of the computing environment of FIG. 3A.
Figure 3C:
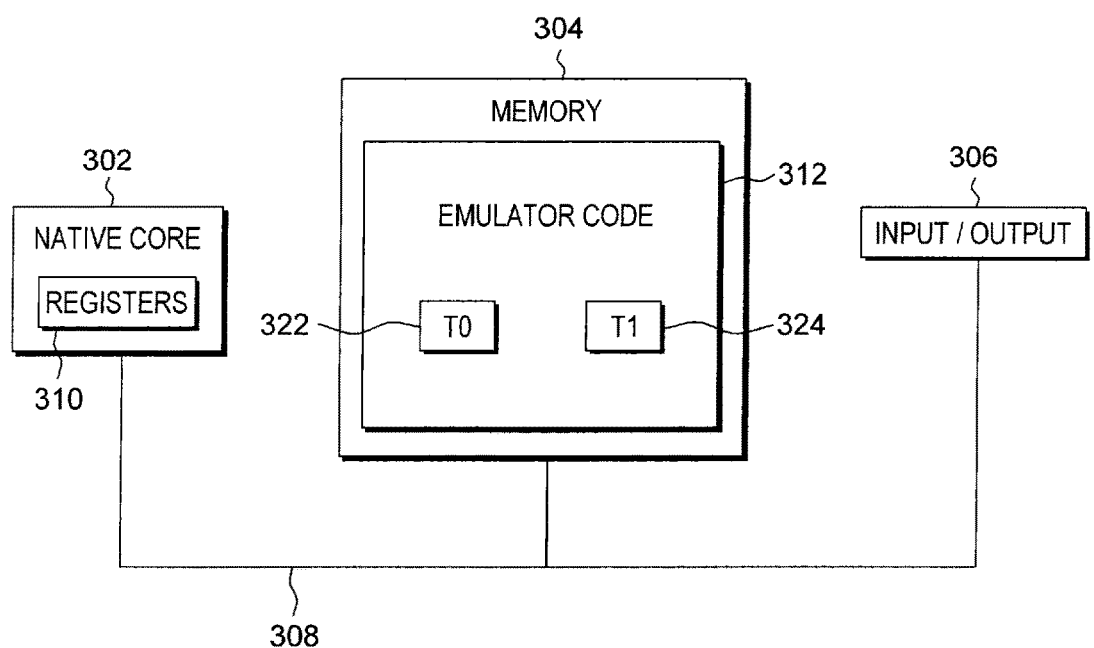
FIG. 3C depicts a further example of a computing environment to incorporate and use one or more aspects of facilitating collection of data in a multi-threaded processor.

In a further embodiment, as shown in FIG. 3C, core 302 is a single-threaded core, but a multi-threaded core is being emulated and included within emulator code 312. For instance, emulator code 312 includes emulated threads 322, 324, each of which is based on an architecture different from the architecture of native core 302, such as the z/Architecture.

Further details relating to emulator code 312 are described with reference to FIG. 3B. Guest instructions 350 stored in memory 304 comprise software instructions (e.g., correlating to machine instructions) that were developed to be executed in an architecture other than that of native core 302. For example, guest instructions 350 may have been designed to execute on a z/Architecture core 202, but instead, are being emulated on native core 302, which may be, for example, an Intel Itanium II processor. In one example, emulator code 312 includes an instruction fetching routine 352 to obtain one or more guest instructions 350 from memory 304, and to optionally provide local buffering for the instructions obtained. It also includes an instruction translation routine 354 to determine the type of guest instruction that has been obtained and to translate the guest instruction into one or more corresponding native instructions 356. This translation includes, for instance, identifying the function to be performed by the guest instruction and choosing the native instruction(s) to perform that function.

Further, emulator code 312 includes an emulation control routine 360 to cause the native instructions to be executed. Emulation control routine 360 may cause native core 302 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 356 may include loading data into a register from memory 304; storing data back to memory from a register; or performing some type of arithmetic or logic operation, as determined by the translation routine.

Each routine is, for instance, implemented in software, which is stored in memory and executed by native core 302. In other examples, one or more of the routines or operations are implemented in firmware, hardware, software or some combination thereof. The registers of the emulated processor may be emulated using registers 310 of the native core or by using locations in memory 304. In embodiments, guest instructions 350, native instructions 356 and emulator code 312 may reside in the same memory or may be disbursed among different memory devices.

The computing environments described above are only examples of computing environments that may be used. Other environments, including, but not limited to, other non-partitioned environments, other partitioned environments, and/or other emulated environments, may be used; embodiments are not limited to any one environment.

In accordance with one or more aspects, a thread of a processor executes a customer's application and may start measurements to collect measurement data of the processor. This processing is further described with reference to FIG. 4.

Figure 4:
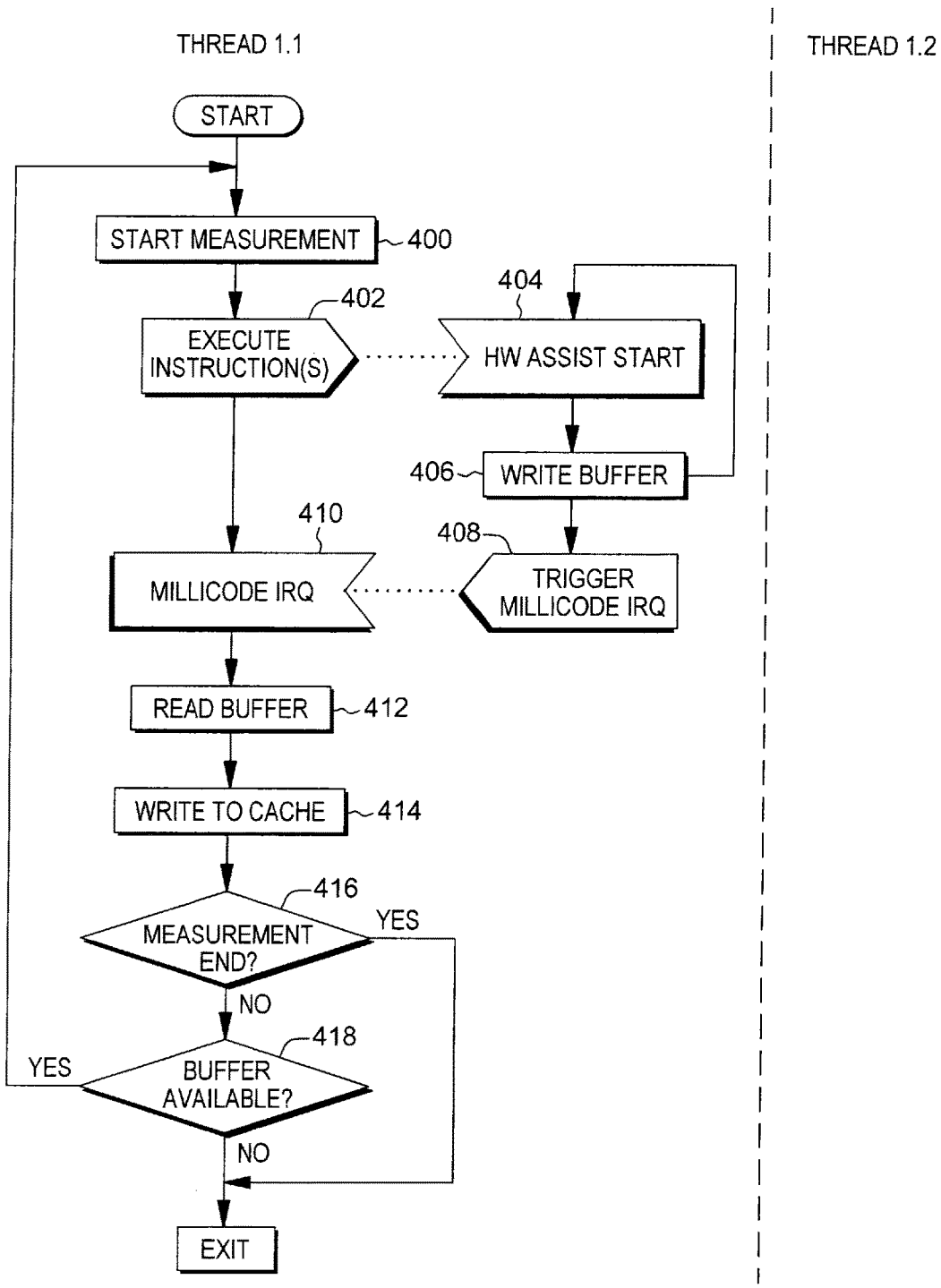
FIG. 4 depicts one embodiment of an execution thread writing to a buffer to collect measurement data, in accordance with an aspect of the present invention.

As shown in FIG. 4, thread 1.1 is an execution thread used to execute a customer application, and thread 1.2 is not set up, in this example. In this embodiment, the customer application of thread 1.1 issues a start measurement to enable collection of measurement data of the processor (e.g., measurement data relating to the processor on which the application is executing and/or relating to the application), STEP 400. The collected data may include, for instance, one or more of: metrics relating to how the application is executing; information regarding cache misses/hits; a count of memory accesses; an indication of translation mode; a number of cycles per instruction; and/or any other information selected to be collected. The start measurement may be an instruction to start measurement, an operator command, or any other mechanism.

Additionally, an instruction of the customer's application is executed, STEP 402, and based on executing the instruction and the issuance of the start measurement, the hardware of thread 1.1 starts to collect requested measurement data, STEP 404. The collected data is written to a buffer starting, e.g., at buffer row zero, STEP 406. This task of collecting the data and writing it to the buffer uses the same processing cycles as executing the instructions of the customer's application.

Thread 1.1 continues to execute the customer application and writes data to the buffer, row by row, STEPs 402, 404, 406. Shortly before the buffer is full, a millicode interrupt is raised by the hardware of thread 1.1 to indicate that the buffer is full or approaching full, STEP 408. The customer data application is interrupted based on the interrupt request, STEP 410, and millicode, as an example, starts reading the buffer, STEP 412, and writing the data contents of the buffer to a defined area in storage, e.g., a cache, main memory, etc., STEP 414.

A determination is made as to whether measurement has ended, INQUIRY 416. For instance, has the measurement been stopped by an instruction, command or other mechanism (e.g., a timeout, etc.). If not, then a further determination is made as to whether the buffer is available for further measurement data, INQUIRY 418. This may be determined based on checking an indicator, such as a valid bit. If the buffer is available, then processing continues with STEP 400. That is, after the buffer is read and written to memory, millicode resets the interrupt and the customer may continue collecting data until the buffer is full again and the millicode interrupt is set, or the end measurement is reached.

Returning to INQUIRY 416, if measurement has ended, then processing is complete.

The use of thread 1.1, the execution thread, to read the buffer and place the buffer contents in memory impacts performance by using execution cycles that could be used to perform customer processing. Thus, in accordance with an aspect of the present invention, a second thread, thread 1.2 in this example, is used to assist in reading the data buffer out to memory or another selected location.

In one example, the multi-threaded processor runs a single threaded workload on one thread, the execution thread, and another thread, an assist thread, is used for hardware measurement data collection to relieve the execution thread from this task. The hardware of the execution thread writes the measurement data into a data buffer that can be accessed (read and written) at the same time (e.g., concurrently) from different threads on the processor. The execution thread continuously runs customer workload and the hardware generates the measurement data. The assist thread is set up for monitoring the contents of the execution thread's data buffer and stores the contents of the data buffer into a selected location, such as in memory, a cache, a persistent storage device or a network, as examples.

The assist thread is, in one embodiment, configured in an assist mode in which it monitors the buffer, obtains (e.g., reads) the data from the buffer (optionally analyzes the data) and stores (e.g., writes) the read data to a selected location. In assist mode, the assist thread relieves the execution thread from these data collection tasks, and performs theses tasks for the execution thread in lieu of, for instance, executing customer applications. In assist mode, in one example, priority is given by the assist thread to obtaining the data from the buffer and storing the obtained data to a selected location. In one particular embodiment, the assist thread may only execute in assist mode, and thus, the assist thread is dedicated for hardware measurement data collection. However, in another embodiment, the assist thread may also execute in another mode, such as an execution mode or another non-assist mode, in which when in this mode, it may execute customer applications or perform other tasks. That is, when the thread is not assisting the execution thread, it may execute other workload, such as low-priority applications or other tasks. Other variations are possible.

As indicated, the execution thread writes to a data buffer, and the assist thread reads the data written by the execution thread from the buffer and writes it to a selected location. The use of this buffer is further described with reference to FIG. 5.

Figure 5:
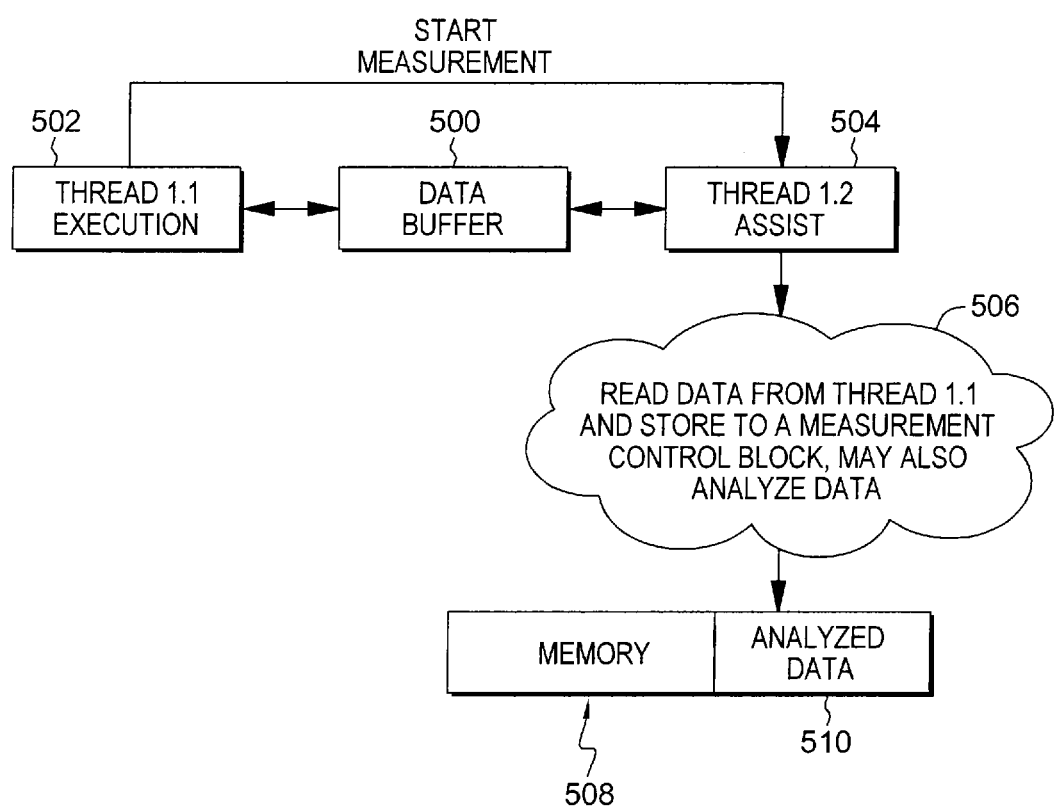
FIG. 5 depicts one embodiment of multiple threads accessing the buffer to facilitate collection of measurement data, in accordance with an aspect of the present invention.

As shown in FIG. 5, a data buffer 500 is accessible by multiple threads, including a thread 1.1 502, the execution thread, and a thread 1.2 504, the assist thread. Thread 1.1 starts the measurement, and writes data in the data buffer, starting, e.g., at row zero. In one example, it also sets a valid bit associated with the row to one. In the meantime, thread 1.2 reads the data from the buffer and resets the valid bit starting at row zero. That is, thread 1.2 reads data from buffer 500 that was written by thread 1.1 and stores the read data to a selected location, such as, e.g., a measurement control block 508. In one embodiment, the assist thread is able to read the data from the buffer and store it in the selected location at such a pace that the execution thread does not encounter a full buffer. However, if the writing of the data wraps back to row zero, and the valid bit of row zero equals one, then, in one embodiment, the buffer is considered full and thread 1.1 waits.

In one example, the data may be analyzed 510 prior to storing the data in the selected location. This analysis may take on many forms, but one form is data compression. Data compression (e.g., using an architected compression instruction or a gzip algorithm, as examples) minimizes the amount of required memory to store the data. As one particular example, the measured data includes the amount of cache misses or memory accesses for an executed instruction, and compression may be used to add each value for n instructions, instead of saving the value for each instruction. Many other compression examples are possible. Further, other types of analyses may take place. For instance, the analysis may include a preprocessing function that performs sorting or some other task. Many possibilities exist. By having the assist thread perform the analysis, instead of the execution thread, the analysis may be performed in parallel to execution of the customer's application. This improves performance.

The use of the two threads is further described with reference to FIG. 6A. In this example, thread 1.1, the execution thread, is executing a customer application, and thread 1.2, the assist thread, is set-up to handle the millicode interrupts, such that the assist thread obtains an indication via, for instance, an interrupt request issued based on data being written to the buffer, that the buffer has data to be read, reads the buffer, based on obtaining the indication, and stores the read data in a selected location, such as in memory (e.g., a defined area), in a cache, etc. In one embodiment, the two threads are defined similarly, in that they execute in the same zone/set-up or they may have the same address translation set-ups, address spaces, etc. That is, in one example, the execution thread is defined to have one or more characteristics (e.g., a particular zone, a certain set-up, selected address translation formats, and/or address spaces, etc.) and the assist thread is also defined to have the one or more characteristics.

Figure 6A:
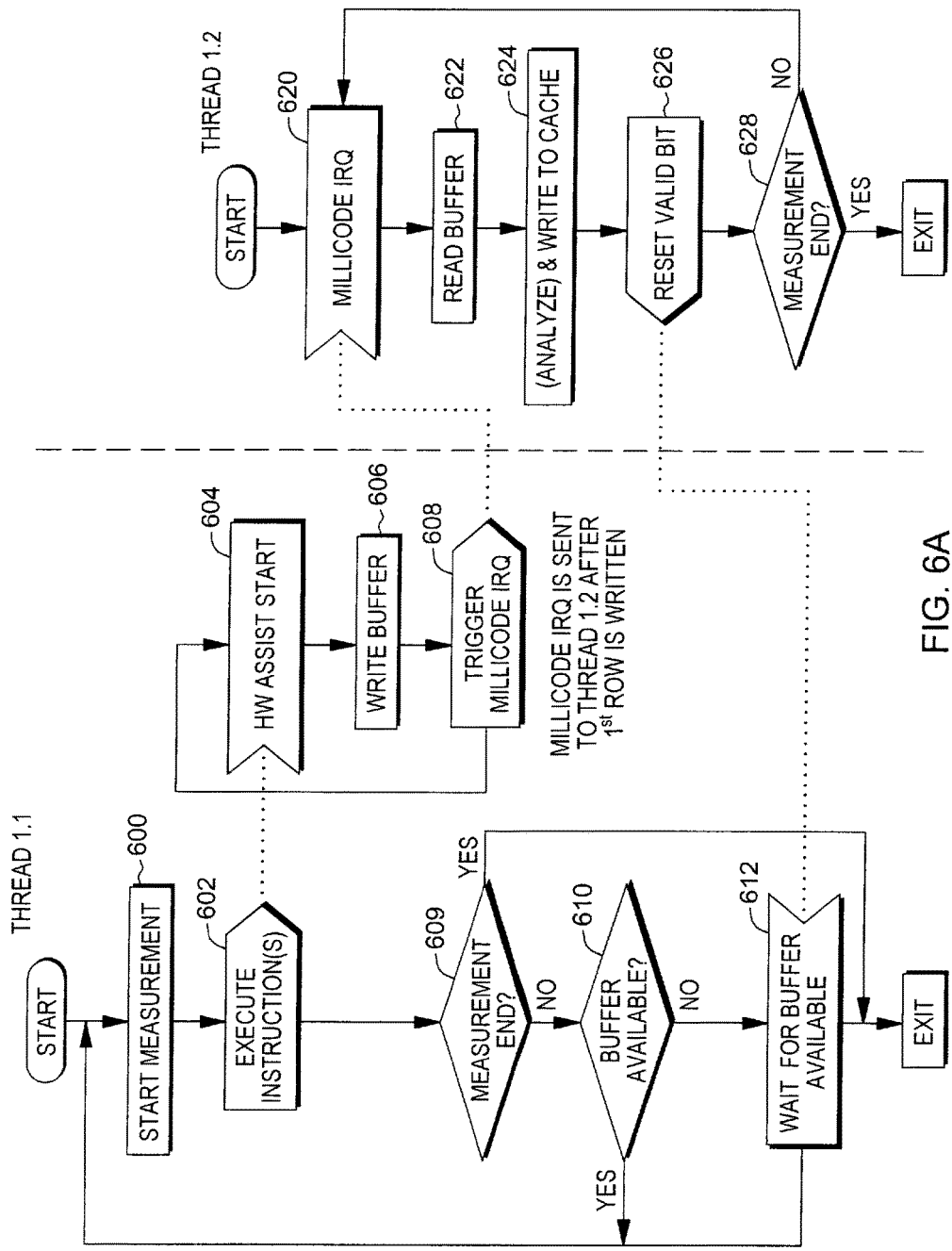
FIG. 6A depicts one embodiment of logic associated with multiple threads accessing the buffer to facilitate collection of measurement data, in accordance with an aspect of the present invention.

Referring to FIG. 6A, initially, thread 1.1 issues a start measurement to enable data collection to begin, STEP 600, and executes an instruction of the customer application, STEP 602. Based on executing the instruction and issuance of the start measurement, the hardware of thread 1.1 starts to collect requested data, STEP 604, and writes the collected data to a buffer starting, e.g., at buffer row zero, STEP 606. In response to the first row (e.g., row zero) being written, a millicode interrupt to thread 1.2 is raised, STEP 608. Thread 1.1 continues to execute the customer application and write data to the buffer, row by row. That is, assuming measurement is to continue, INQUIRY 609 (i.e., measurement has not been ended by an instruction, a command or another mechanism, such as a timeout, etc.), and the buffer is available and not full, INQUIRY 610, thread 1.1 continues to write to the buffer, row by row, as described above. However, if measurement has ended, INQUIRY 609, then processing is complete. Further, if the buffer is not available or full, as indicated by, for instance, a set indicator (e.g., a valid bit for each row of the buffer set to one), but measurement is to continue, then thread 1.1 waits until the buffer is available and has capacity indicated by, for instance, a valid bit being set to zero, STEP 612.

As indicated above, in response to thread 1.1 writing the first row of data in the buffer, thread 1.2 receives the millicode interrupt request, STEP 620, and begins to read the buffer starting, e.g., at row zero, STEP 622. That is, thread 1.2 (the assist thread) obtains the data placed in the buffer by thread 1.1 (the execution thread) and stores the data obtained from the buffer in a selected location. For instance, thread 1.2 writes the data read from the buffer to a selected location, such as a defined area in memory or a cache (e.g., a measurement control block), a persistent storage device, a network, etc., STEP 624. This is the same location that thread 1.1 would have written the measurement data if the assist thread was not being used. Further, in one embodiment, the read data is analyzed, if desired, and then written to the selected location. As thread 1.2 reads a row from the buffer and writes it to the selected location, it resets the valid bit of that row (e.g., sets it to zero), STEP 626, and indicates the same to thread 1.1, or otherwise, makes this information available to thread 1.1, STEP 612. If measurement has not ended, INQUIRY 628, then processing continues at STEP 620. Otherwise, processing is complete.

Figure 6B:
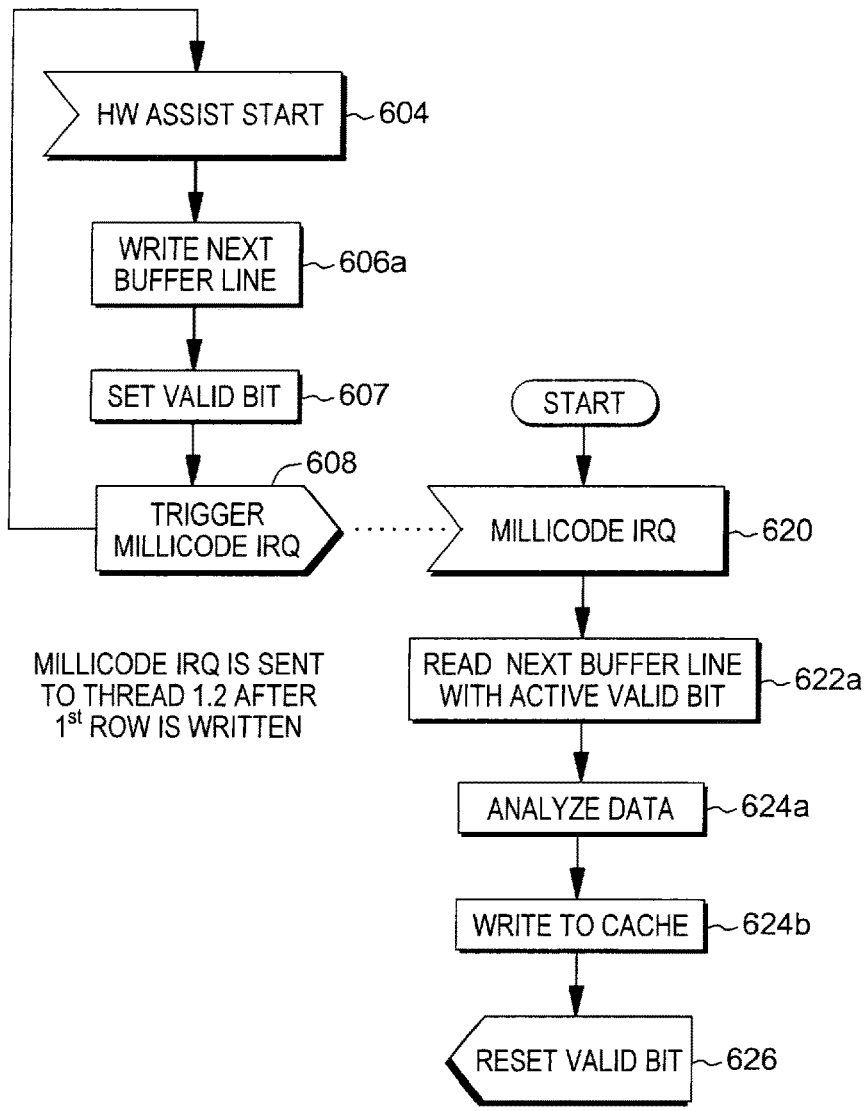
FIG. 6B depicts further details of logic associated with accessing the buffer, in accordance with an aspect of the present invention.

Further details regarding writing the data to and reading the data from the buffer are described with reference to FIG. 6B. In this example, when there is a hardware assist start, 604, the next buffer line or row (as indicated by a "next" index of the buffer) is written, STEP 606a, and a valid bit associated with that line or row is set (e.g., to one), STEP 607. Then, a millicode interrupt request is triggered, STEP 608, and the request is received at thread 1.2, STEP 620. Based thereon, thread 1.2 reads the next buffer line with an active valid bit (e.g., set to one), STEP 622a. The data is optionally analyzed, STEP 624a, and written to the selected location, e.g., cache, designated area in memory, etc., STEP 624b. The valid bit is then reset (e.g., set to zero), STEP 626.

Figure 7:
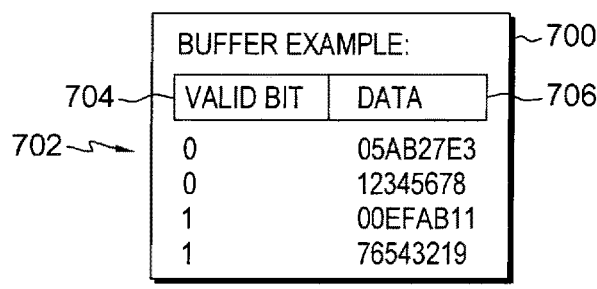
FIG. 7 depicts one example of a buffer, in accordance with an aspect of the present invention.

One example of a buffer is depicted in FIG. 7. As shown, a buffer 700 includes a plurality of lines or rows 702, and each line or row includes a valid bit 704 and data 706. The valid bit indicates whether the row has been read and written to the selected location (e.g., cache, memory, measurement control block, persistent storage device, network, etc.). In this example, a valid bit of zero indicates the line or row has been processed (i.e., read and written to the selected location), and a valid bit of one indicates the line or row still has to be processed.

As described above, in one aspect, on a multi-threaded processor which runs a single threaded workload, a secondary thread is used for hardware measurement data collection to relieve the execution thread from this task. The hardware writes the measurement data into a data buffer (e.g., a private data buffer for collecting data for that thread) that can be accessed (read and written) at the same time from different threads on the processor. The execution thread continuously runs customer workload and hardware generates the measurement data. The assist thread on this processor is set up for monitoring the contents of the execution thread's data buffer and storing the contents of the data buffer into memory, a cache or other selected location. On the execution thread, a buffer full indication/pacing is used to ensure the buffer does not overflow. On the assist thread, the firmware is optimized to minimize impact to the execution thread's performance. That is, it does not, for instance, compete for the same hardware resources, such as, for instance, processor registers, cache, I/O, etc. For example, the assist thread is configured to minimize interference with the execution thread's resources (e.g., registers) or use of hardware resources that are shared between the execution thread and the assist thread (e.g., cache lines or execution units). As examples, it has a smaller footprint and does not consume many cache lines, and minimizes use of certain hardware facilities, for example, floating point execution units. It may also use separate cache and memory areas, except for accessing the buffer. Other possibilities exist.

It is expected that this workload pattern works well with multithreading. Some analysis of the data before storing it into the selected location, such as compression or sorting, may optionally be performed. In one example, the execution thread and the assist thread are in the same zone or have the same set-up, which may include, for instance, the same address translation set-ups, address spaces, etc. By offloading the measurement data collection and analysis to another thread, performance improvement of the execution thread can be realized by minimizing the penalty for hardware measurements.

As used herein, storage, central storage, main storage, memory and main memory are used interchangeably, unless otherwise noted, implicitly by usage or explicitly.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 8:
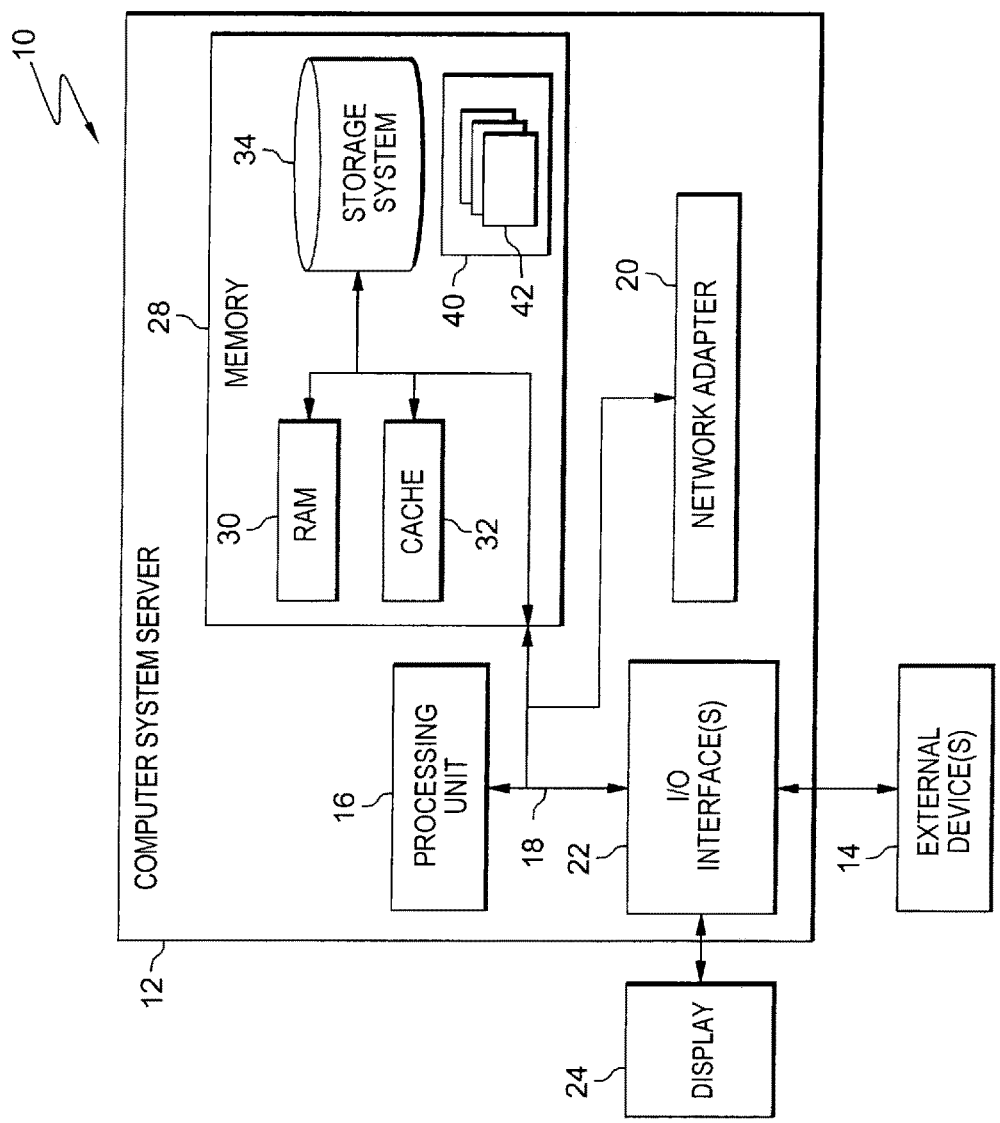
FIG. 8 depicts one embodiment of a cloud computing node.

Referring now to FIG. 8, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 9:
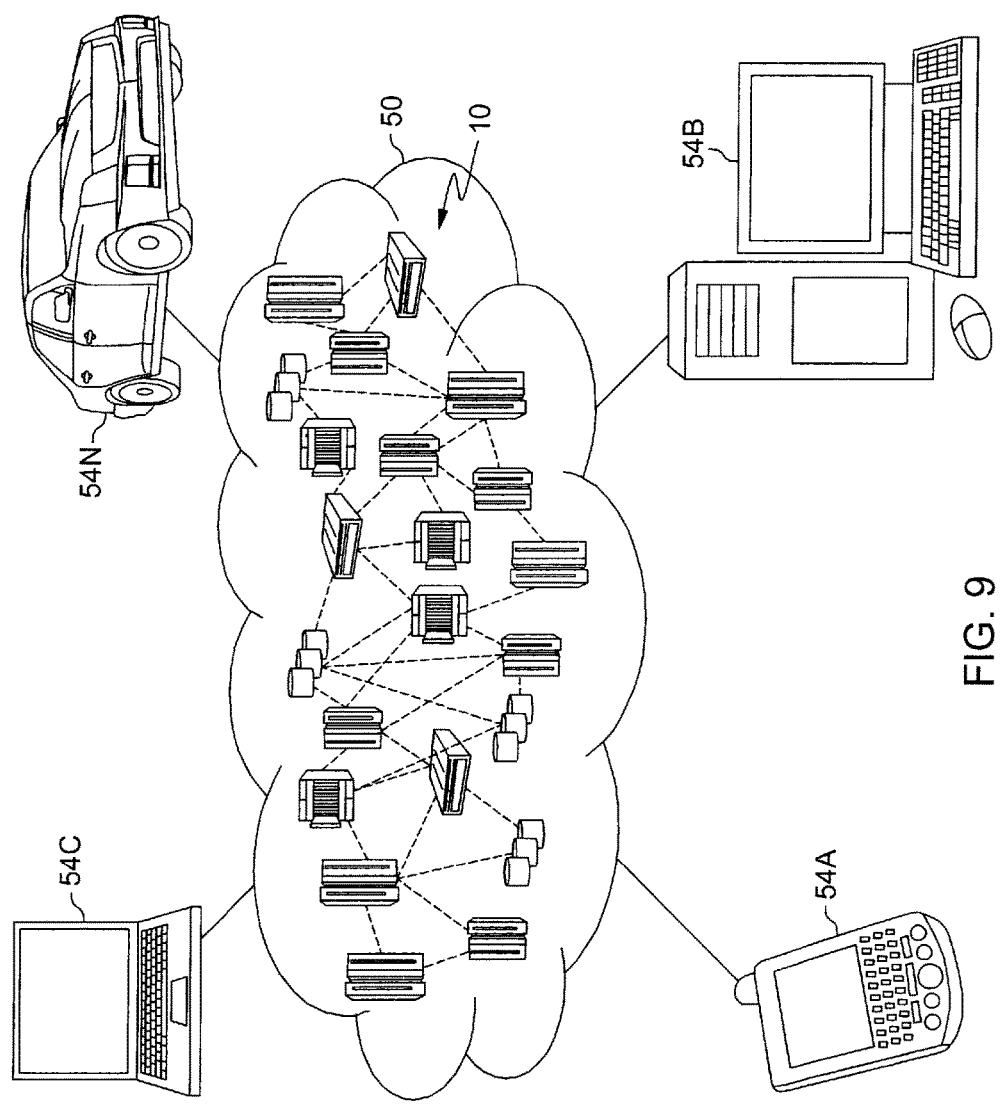
FIG. 9 depicts one embodiment of a cloud computing environment.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
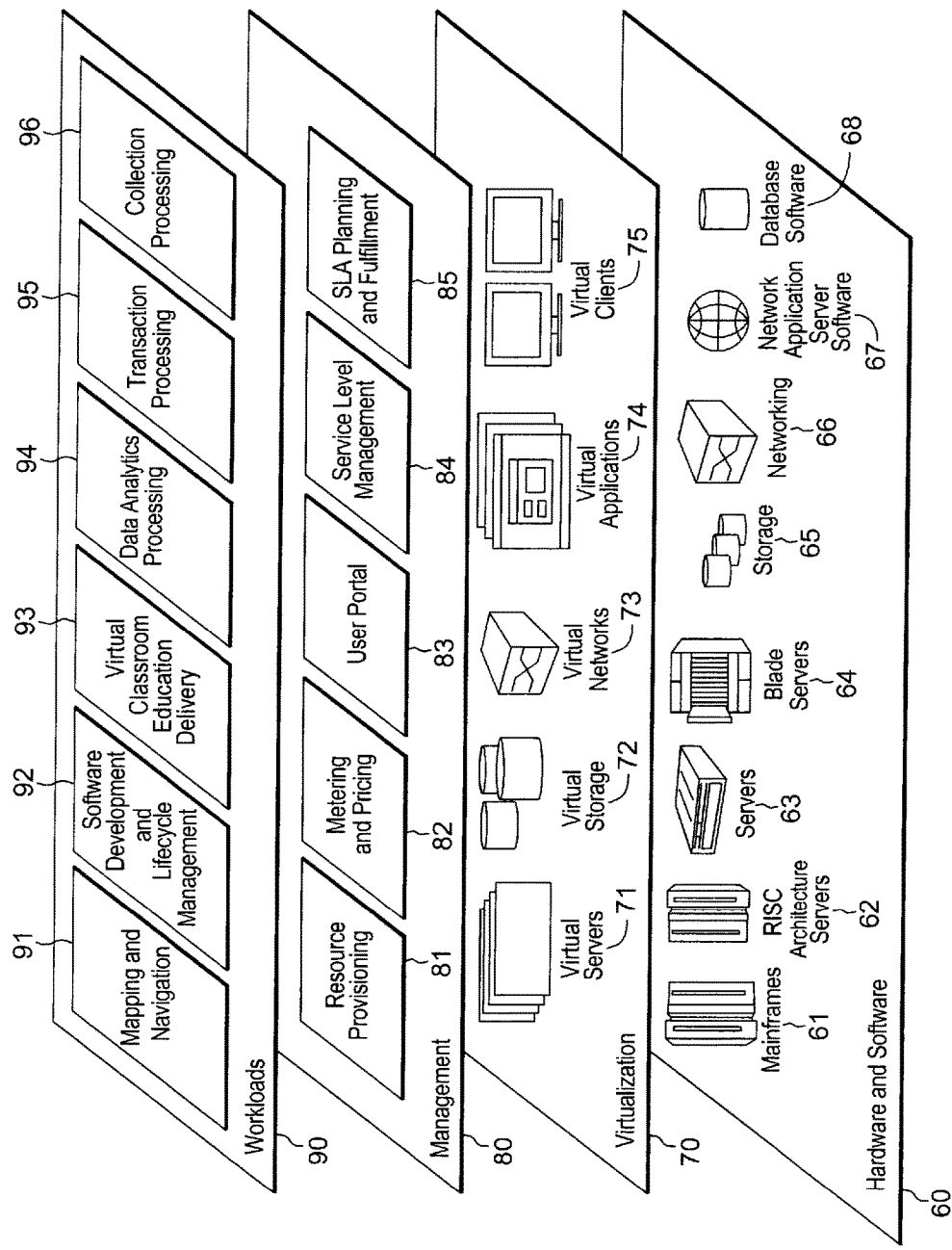
FIG. 10 depicts one example of abstraction model layers.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and collection processing of one or more aspects of the present invention 96.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, other types of analysis may be provided and/or other mechanisms may be used to indicate when the buffer is full. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer system for facilitating data collection, the computer system comprising:
   a memory; and
   a processor in communication with the memory, wherein the computer system is configured to perform a method, said method comprising:
   obtaining, by one thread of the processor, data placed in a buffer by another thread of the processor, the one thread and the other thread executing on the processor, and the buffer being on the processor, the other thread being an execution thread executing a customer application and the one thread being an assist thread configured to execute in at least an assist mode, wherein the data placed in the buffer on the processor by the other thread comprises measurement data of the processor collected by the other thread based on the customer application that is being executed by the other thread issuing a start measurement to enable collection of the measurement data of the processor, wherein the data is written into the buffer in rows of the buffer, each row having associated therewith a respective valid bit indicating whether data written into that row has been processed by the one thread; and
   based on obtaining the data from the buffer, storing, by the one thread, the data obtained from the buffer in a selected location outside of the processor on which the one thread executes, and resetting the valid bit associated with each row, of the buffer, from which the data was obtained, the resetting indicating that the row has been processed, wherein based on the one thread being in the assist mode, the obtaining and the storing are performed in lieu of executing customer applications by the one thread, and in lieu of the other thread storing to the selected location the data that the one thread already stored in the selected location, wherein the one thread executes in both the assist mode and a non-assist mode, wherein executing in the assist mode comprises the one thread accessing the data initially placed in the buffer by the other thread and performing the storing of the data in the selected location, and relieving the other thread from re-accessing the buffer to obtain the data initially placed in the buffer by the other thread and perform the storing, and wherein executing in the non-assist mode comprises the one thread executing other workload when not assisting the other thread.

2. The computer system of claim 1, wherein the buffer is concurrently accessible by the one thread and the other thread.

3. The computer system of claim 1, wherein the one thread is defined to have one or more characteristics and the other thread is defined to have the one or more characteristics.

4. The computer system of claim 1, wherein the method further comprises:
   obtaining, by the one thread, an indication the buffer has data to be read;
   reading, by the one thread, the buffer, based on obtaining the indication the buffer has data to be read; and
   performing the storing, by the one thread, the data read from the buffer in the selected location.

5. The computer system of claim 4, wherein the obtaining the indication comprises receiving an interrupt request, the interrupt request issued based on data being written to the buffer.

6. The computer system of claim 1, wherein the method further comprises placing the data in the buffer, the placing the data in the buffer including:
   determining whether the buffer has capacity for the data; and
   placing the data in the buffer, based on the determining indicating the buffer has capacity.

7. The computer system of claim 6, wherein the determining whether the buffer has capacity comprises checking one or more valid bits.

8. The computer system of claim 1, wherein the selected location comprises one of a cache, main memory, a measurement control block, a persistent storage device, or a component of a network.

9. A computer program product for facilitating data collection, the computer program product comprising:
   a non-transitory computer readable storage medium readable by a processing circuit and storing instructions for execution by the processing circuit for performing a method comprising:
   obtaining, by one thread of a processor, data placed in a buffer by another thread of the processor, the one thread and the other thread executing on the processor, and the buffer being on the processor, the other thread being an execution thread executing a customer application and the one thread being an assist thread configured to execute in at least an assist mode, wherein the data placed in the buffer on the processor by the other thread comprises measurement data of the processor collected by the other thread based on the customer application that is being executed by the other thread issuing a start measurement to enable collection of the measurement data of the processor, wherein the data is written into the buffer in rows of the buffer, each row having associated therewith a respective valid bit indicating whether data written into that row has been processed by the one thread; and based on obtaining the data from the buffer, storing, by the one thread, the data obtained from the buffer in a selected location outside of the processor on which the one thread executes, and resetting the valid bit associated with each row, of the buffer, from which the data was obtained, the resetting indicating that the row has been processed, wherein based on the one thread being in the assist mode, the obtaining and the storing are performed in lieu of executing customer applications by the one thread, and in lieu of the other thread storing to the selected location the data that the one thread already stored in the selected location, wherein the one thread executes in both the assist mode and a non-assist mode, wherein executing in the assist mode comprises the one thread accessing the data initially placed in the buffer by the other thread and performing the storing of the data in the selected location, and relieving the other thread from re-accessing the buffer to obtain the data initially placed in the buffer by the other thread and perform the storing, and wherein executing in the non-assist mode comprises the one thread executing other workload when not assisting the other thread.

10. The computer program product of claim 9, wherein the method further comprises:

obtaining, by the one thread, an indication the buffer has data to be read;

reading, by the one thread, the buffer, based on obtaining the indication the buffer has data to be read; and performing the storing, by the one thread, the data read from the buffer in the selected location.

11. The computer program product of claim 9, wherein the method further comprises placing the data in the buffer, the placing the data in the buffer including:

determining whether the buffer has capacity for the data; and placing the data in the buffer, based on the determining indicating the buffer has capacity.

12. A computer-implemented method of facilitating data collection, the computer-implemented method comprising:

obtaining, by one thread of a processor, data placed in a buffer by another thread of the processor, the one thread and the other thread executing on the processor, and the buffer being on the processor, the other thread being an execution thread executing a customer application and the one thread being an assist thread configured to execute in at least an assist mode, wherein the data placed in the buffer on the processor by the other thread comprises measurement data of the processor collected by the other thread based on the customer application that is being executed by the other thread issuing a start measurement to enable collection of the measurement data of the processor, wherein the data is written into the buffer in rows of the buffer, each row having associated therewith a respective valid bit indicating whether data written into that row has been processed by the one thread; and based on obtaining the data from the buffer, storing, by the one thread, the data obtained from the buffer in a selected location outside of the processor on which the one thread executes, and resetting the valid bit associated with each row, of the buffer, from which the data was obtained, the resetting indicating that the row has been processed, wherein based on the one thread being in the assist mode, the obtaining and the storing are performed in lieu of executing customer applications by the one thread, and in lieu of the other thread storing to the selected location the data that the one thread already stored in the selected location, wherein the one thread executes in both the assist mode and a non-assist mode, wherein executing in the assist mode comprises the one thread accessing the data initially placed in the buffer by the other thread and performing the storing of the data in the selected location, and relieving the other thread from re-accessing the buffer to obtain the data initially placed in the buffer by the other thread and perform the storing, and wherein executing in the non-assist mode comprises the one thread executing other workload when not assisting the other thread.

13. The computer-implemented method of claim 12, wherein the buffer is concurrently accessible by the one thread and the other thread.

14. The computer-implemented method of claim 12, wherein the one thread is defined to have one or more characteristics and the other thread is defined to have the one or more characteristics.

15. The computer-implemented method of claim 1, further comprising:

obtaining, by the one thread, an indication the buffer has data to be read;

reading, by the one thread, the buffer, based on obtaining the indication the buffer has data to be read; and performing the storing, by the one thread, the data read from the buffer in the selected location.

16. The computer-implemented method of claim 15, wherein the obtaining the indication comprises receiving an interrupt request, the interrupt request issued based on data being written to the buffer.

17. The computer-implemented method of claim 12, further comprising placing the data in the buffer, the placing the data in the buffer including:

determining whether the buffer has capacity for the data; and placing the data in the buffer, based on the determining indicating the buffer has capacity.

18. The computer-implemented method of claim 17, wherein the determining whether the buffer has capacity comprises checking one or more valid bits.

19. The computer-implemented method of claim 12, wherein the selected location comprises one of a cache, main memory, a measurement control block, a persistent storage device, or a component of a network.

* * * * *